No. 875,835.

PATENTED JAN. 7, 1908.

P. J. MUELLER.
SPEED REGULATOR FOR SPRING MOTORS.
APPLICATION FILED MAY 18, 1907.

WITNESSES:

INVENTOR
Peter J. Mueller,
BY Franklin H. Hough
Attorney

UNITED STATES PATENT OFFICE.

PETER J. MUELLER, OF LAMOTTE, IOWA.

SPEED-REGULATOR FOR SPRING-MOTORS.

No. 875,835.  Specification of Letters Patent.  Patented Jan. 7, 1908.

Application filed May 18, 1907. Serial No. 374,458.

*To all whom it may concern:*

Be it known that I, PETER J. MUELLER, a citizen of the United States, residing at Lamotte, in the county of Jackson and State of Iowa, have invented certain new and useful Improvements in Speed-Regulator for Spring-Motors; and I do hereby declare the following to be a full, clear, and exact description of the invention, such as will enable others skilled in the art to which it appertains to make and use same, reference being had to the accompanying drawings, and to the letters and figures of reference marked thereon, which form a part of this specification.

This invention relates to new and useful improvements in spring motor apparatus designed for various uses, and especially adapted for cream separators.

The invention consists in various details of construction and combinations and arrangements of parts which will be hereinafter fully described and then specifically defined in the appended claims.

I illustrate my invention in the accompanying drawings, in which:—

Figure 1:
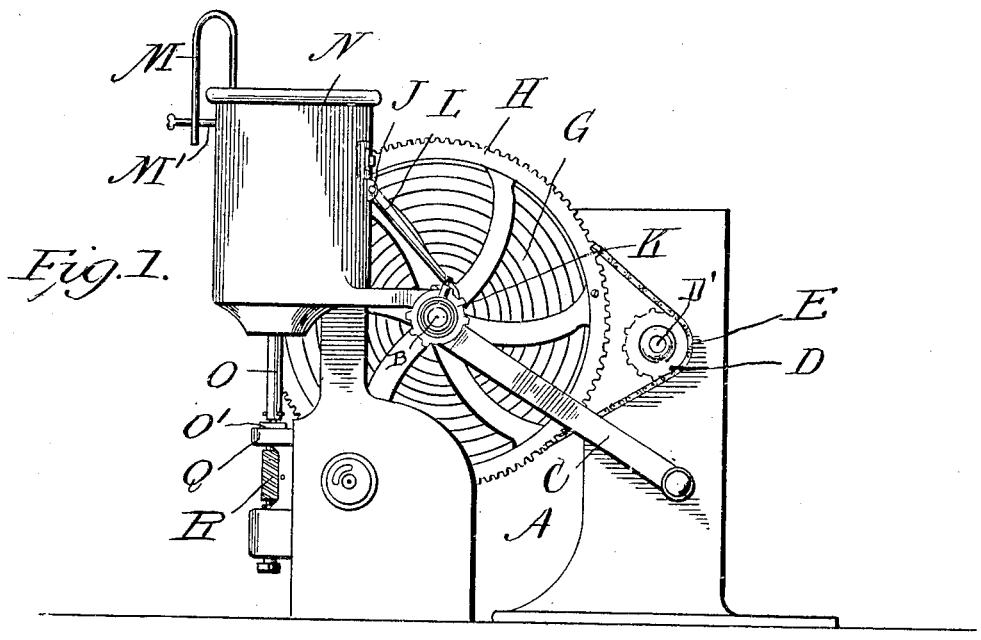
Figure 2:
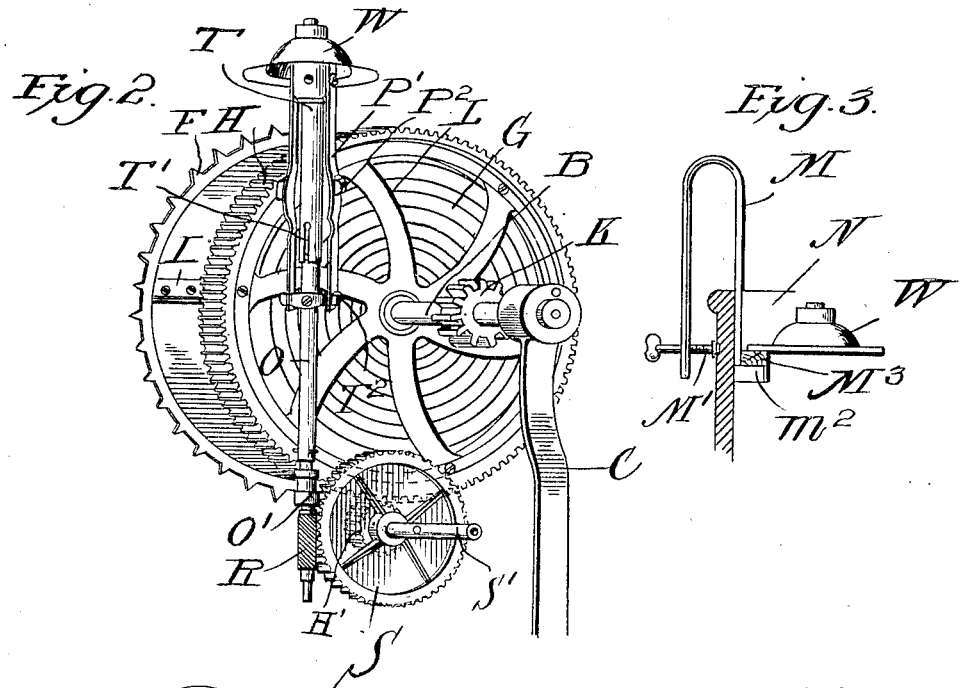
Figure 3:
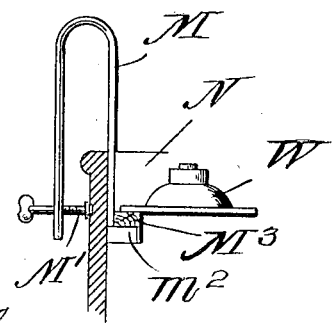

Figure 1 is a side elevation of my spring motor connected to a cream separator. Fig. 2 is a detail perspective view showing the motor with the separator casing removed, and Fig. 3 is a detail view of the brake mechanism for regulating the speed of the motor.

Reference now being had to the details of the drawings by letter, A designates the frame of the apparatus in which a shaft B is mounted in suitable bearings, and C designates a crank fixed to said shaft.

D designates a sprocket wheel which is fixed upon a shaft D', and E is a sprocket chain passing about said sprocket wheel D and also a sprocket wheel F which is fixed to the gear H. Fixed to said shaft B is a coil spring G, the other end of which is secured to the gear wheel H by means of the straps I.

Fixed to the shaft B is a gear wheel K, and L is a dog adapted to engage said wheel K and is pivotally mounted upon a pin J upon the casing N.

O designates a shaft which has bearings in the bottom of the casing N and also in a collar O' which is mounted in an apertured boss Q upon the frame, the portion of the shaft O which passes through said collar O' being contracted and allowing a limited play for the shaft in said collar.

R designates a worm fixed to or formed integral with said shaft O and is in mesh with a worm wheel S mounted on and rotating with the shaft S' which is mounted in suitable bearings in the frame. A gear wheel H' is fixed to the shaft S' and is adapted to mesh with the gear wheel H, whereby the shaft S' may be rotated as the spring unwinds.

Mounted to telescope over said vertical shaft O is a hollow shaft T having slots T' formed diametrically opposite each other and through which the lugs T² pass for the purpose of guiding the hollow shaft T.

P' designate resilient metallic straps which are secured at their lower ends to the lug T² fixed to the shaft O and at their upper ends to a fixed collar mounted upon the hollow shaft T, and W designates a disk which is fixed to the upper end of said shaft T. P² are weights fixed to said straps P.

M designates an inverted U-shaped member having a set-screw M' mounted in a threaded aperture therein and is adapted to coöperate with said member to hold the latter in an adjusted position upon the casing. Projecting laterally from the end of the member which extends into the casing N is a lug M in which is mounted a plug M³ preferably of wood or other fibrous cushioning material and is disposed in the path of said disk and against which plug, said disk is adapted to contact frictionally to limit its downward throw and also to brake the speed of said shaft.

From the foregoing, it will be noted that by the provision of an apparatus embodying the features of my invention, in which the spring is wound up to afford power, the shaft of the separator may be given a continuous rotary movement, the speed of the apparatus being regulated by raising or lowering said inverted U-shaped member, the raising of said member causing the speed to decrease, while pushing down upon the same will cause the motion to increase.

What I claim is:—

A frictional speed governor apparatus for motors comprising a casing, a vertically mounted shaft therein, a hollow shell telescoping over said shaft, a disk fitted to said shell, a fixed collar upon the shaft, spring arms connecting the disk with said collar, a stop adjustably clamped to the wall of the casing and having a lateral projection on the inner surface thereof in the path of said disk, said stop having a U-shaped shank portion extending over the edge of the casing, the outer end of said shank portion being apertured, a clamping screw carried by said aperture and adapted to bear against the outer edge of the casing, and means for rotating the shaft, as set forth.

In tesimony whereof I hereunto affix my signature in the presence of two witnesses.

PETER J. MUELLER.

Witnesses:
J. C. HAXMEIER,
J. F. KIRCHER.